United States Patent [19]

Levin

[11] 4,364,888
[45] Dec. 21, 1982

[54] METHOD AND APPARATUS FOR EXTRUDING A HONEYCOMB STRUCTURE

[75] Inventor: Philip S. Levin, Rocky Hill, Conn.

[73] Assignee: Corning Glass Works, Corning, N.Y.

[21] Appl. No.: 260,343

[22] Filed: May 4, 1981

[51] Int. Cl.³ .............................................. B29F 3/04
[52] U.S. Cl. ........................... 264/177 R; 264/209.8;
425/197; 425/461; 425/466
[58] Field of Search ............. 264/177 R, 209.1, 209.8,
264/176 R, 56, 61; 425/197–199, 461–467, 376
A

[56] References Cited

U.S. PATENT DOCUMENTS

| | | | |
|---|---|---|---|
| 2,524,829 | 10/1950 | Perzel | 425/465 |
| 2,597,638 | 5/1952 | Higbie | 425/467 |
| 3,382,535 | 5/1968 | Ferrari | 425/461 |
| 3,888,963 | 6/1975 | Orso et al. | 425/197 |
| 3,900,546 | 8/1975 | Kaukeinen | 425/198 |
| 4,008,033 | 2/1977 | Folmar et al. | 425/467 |
| 4,046,103 | 9/1977 | Yakuboff | 425/461 |
| 4,168,944 | 9/1979 | Morikawa et al. | 425/464 |
| 4,178,145 | 12/1979 | Hamamoto et al. | 425/467 |
| 4,278,412 | 7/1981 | Ozaki et al. | 425/464 |
| 4,298,328 | 11/1981 | Frost | 425/467 |

FOREIGN PATENT DOCUMENTS

| | | | |
|---|---|---|---|
| 2421311 | 11/1974 | Fed. Rep. of Germany | 425/464 |
| 52-51792 | 4/1977 | Japan. | |
| 53-137260 | 11/1978 | Japan. | |

Primary Examiner—Jeffery R. Thurlow
Attorney, Agent, or Firm—Richard N. Wardell

[57] ABSTRACT

Elimination of shearing flow, having an inwardly radial flow and velocity gradient, of extrudable material entering a die for forming a honeycomb structure with a plurality of thin-walled cells, thereby avoiding irregularities in the extruded structure. The shearing flow, resulting from reducing cross-sectional area of a Bingham plastic material (e.g. a cordierite-forming, plastically moldable ceramic batch material) passing through a funnel section tapering inwardly from an extrusion barrel, is changed to plug flow by maintaining constant the reduced cross-sectional area through a straight-walled portion of an entrance cavity feeding the material to the die, which has passageways including a plurality of feed holes communicating with interconnected discharge slots sequentially in the extrusion detection for forming the honeycomb structure.

29 Claims, 6 Drawing Figures

METHOD AND APPARATUS FOR EXTRUDING A HONEYCOMB STRUCTURE

BACKGROUND OF THE INVENTION

This invention relates to a honeycomb structure or matrix of the type having thin-walled, open-ended cells extending generally along the axis of the structure. More particularly, this invention relates to a method and apparatus for extruding such a structure.

A structure of this type may be made by advancing a batch of extrudable material such as a cordierite mixture toward an extrusion die having a plurality of feed holes supplying a gridwork of discharge slots. Typically, a backing plate having a generally cylindrical opening defining the desired cross-sectional shape or area of the structure which is substantially smaller than the cross-sectional area of the extrusion barrel itself is located immediately behind the die. The front of the die may be fitted with a suitable mask so as to crush the peripheral cells of the extruded structure thereby forming a substantially uniform skin around the periphery of the structure.

When the extrudable material reaches the backing plate, there is a necessity for the extrudable material to be directed radially inwardly toward the cylindrical opening in the backing plate. The flow, which may be achieved by the accumulation of a stagnant zone of extrudable material behind the backing plate radially outwardly from the opening, becomes a shearing flow of the extrudable material, i.e., flow having an inwardly radial flow and velocity gradient. If the peripheral or other portion of the extrudable material is in a state of radial shearing flow at the time the material enters the extrusion die, there is a resulting non-uniformity of flow at and through the extrusion die. The non-uniformity of flow can produce irregularities in the skin if the flow is too slow in the peripheral portions of the die vis-a-vis the flow through the central portions of the die. An example of such irregularities is the tearing of the skin especially where there is an interface between two separate batches or billets of extrusion material. In the alternative, the non-uniformity of flow can result in the crushing of cells near the periphery of the matrix adjacent the skin if the flow is too fast through the peripheral portions of the die. These problems are only compounded when the structure itself is noncircular in cross-section perpendicular to the direction of the flow, i.e., axially asymmetric, especially where the noncircular or asymmetric configuration has a high aspect ratio, e.g., the major to minor axis ratio of the noncircular cross-section is substantially greater than one. Structures having such a high aspect ratio include oval or "racetrack" designs which are commonly utilized in catalytic converters for vehicles where the structure comprises a ceramic material.

U.S. Pat. No. 3,888,963—Orso et al. discloses an extrusion apparatus for making a honeycomb structure wherein the extrusion die is preceded by a homogenizing assembly forming a straight-walled entrance cavity for the die having a cross-sectional area substantially corresponding with the cross-sectional area of openings in the homogenizing assembly. The cross-sectional area of the cavity substantially corresponds with the cross-sectional, flow-through area of the exposed inlet face of the extrusion die and thus the structure to be extruded thereby eliminating any shearing flow at the extrusion die. A similar straight-walled cavity immediately preceding the extrusion die is disclosed in U.S. Pat. No. 4,168,944—Morikawa et al.

Japanese Patent application No. 1977-51792, filed May 4, 1977 (Japanese Unexamined Patent Application Publication No. 53-137260 dated Nov. 30, 1978) discloses an extrusion die preceded by a cavity which expands outwardly from a smaller cross-sectional area remote from extrusion die to a larger cross-sectional area adjacent the extrusion die. This apparatus relies on the principle that a convex shearing profile may be flattened by passing the batch material through an expansion zone immediately preceding the die. However, the expansion zone becomes dimensionally critical, i.e., the cavity must have a certain length. Moreover, the rate of expansion itself becomes quite critical to assure flattening of the convex shearing profile. This criticality in expansion is also somewhat complicated when applied to structures of noncircular or axially asymmetric configuration. Furthermore, the outward taper or funnel of the Japanese patent application is critically dependent upon the rheology of the extrusion material. Finally, the outward taper or funnel of the Japanese application can result in stagnant zones immediately adjacent the extrusion die which can produce shearing flow at the die with adverse effects on skin quality or resultant cell crushing.

SUMMARY OF THE INVENTION

It is an object of this invention to provide a method and apparatus for extruding a honeycomb structure having good skin quality.

It is another object of this invention to provide a method and apparatus for extruding a honeycomb structure with good skin quality without undesirable crushing of peripheral cells.

It is another object of this invention to provide a method and apparatus for extruding a honeycomb structure with good cell quality.

It is a further object of this invention to provide a method and apparatus for extruding a honeycomb structure wherein the quality of the structure is not adversely affected by the transition or interface between one batch or billet of extrusion material in the apparatus and the next batch or billet of extrusion material in the apparatus.

It is a still further object of this invention to provide a simplified method and apparatus for extruding a honeycomb structure.

It is a further object of this invention to provide a method and apparatus wherein there is substantial insensitivity to the variations in the skin forming apparatus.

It is still another object of this invention to provide a method and apparatus for extruding a honeycomb structure wherein uniformity in extrusion die wear is achieved.

It is a further object of this invention to provide a method and apparatus for reliably extruding a honeycomb structure which is noncircular in cross-section transverse to the direction of extrusion.

It is yet another object of this invention to provide a method and apparatus for extruding a honeycomb structure which is insensitive to changes in the rheology of the extrusion material which may be encountered.

It is a further object of this invention to provide a method and apparatus which advantageously utilizes the yield stress threshold of a Bingham plastic extrusion material.

In accordance with these and other objects of the invention, a method and apparatus is provided for advancing an extrusion material toward an extrusion die. The cross-sectional area of the material transverse to the direction of advancement is then reduced so as to create shearing flow in the material as the material is advanced toward the die. Plug flow is subsequently established substantially terminating shearing flow in the material prior to reaching the extrusion die. The material is then extruded through the die so as to form the structure.

In a particularly preferred embodiment of the invention, the foregoing is accomplished utilizing an extrusion barrel including an extrusion die for forming the structure from a Bingham plastic material. The extrusion die which is axially aligned with the barrel has a lesser cross-sectional area than the maximum cross-sectional area of the extrusion barrel. The entrance cavity includes a funnel section tapering or curving inwardly from a larger cross-sectional area to a smaller cross-sectional area and a substantially straight-walled section between the funnel section and the die having a substantially uniform cross-sectional area substantially corresponding to the cross-sectional area of the exposed flow-through area of the inlet surface in the extrusion die. The extrusion material is advanced through the entrance cavity with the shearing flow present in the funnel section reverting to plug flow in the straight-walled section.

The preferred embodiment of the invention further comprises a mask at the outlet of the extrusion die. The mask includes a peripheral portion covering a plurality of passageways in the extrusion die and a central opening having a cross-sectional area substantially corresponding to the cross-sectional area of the structure such that the peripheral portion collapses peripheral cells of the extruded structure to form a uniform skin without excessive cell crushing.

The preferred embodiment further comprises homogenizing means including a plurality of openings located in advance of the entrance cavity.

In accordance with one important aspect of the invention, the cross-sectional area of the funnel section and the cross-sectional area of the straight section are non-circular.

In accordance with another important aspect of the invention, the taper or curve of the funnel section is contoured such that the rate of taper changes as the function of distance from the straight section. Preferably, the rate of taper is greatest at the extremity of the funnel section remote from the straight section and decreases to a minimum adjacent the straight section.

In accordance with another important aspect of the invention, the axial length of the straight section is at least 0.5 inches so as to assure reversion to plug flow. In accordance with this aspect of the invention, the axial length is at least 12% of the maximum reduction in a cross-sectional dimension of the extrusion material passing through the funnel section.

In accordance with another important aspect of the invention, the funnel section may include a polished surface for contacting the extrusion material where the finish of the surface has a roughness less than 200 microinches. The straight-walled section may also include a polished surface for contacting the extruded material where the surface has a roughness of less than 200 microinches.

DETAILED DESCRIPTION OF A PREFERRED EMBODIMENT

Figure 1:
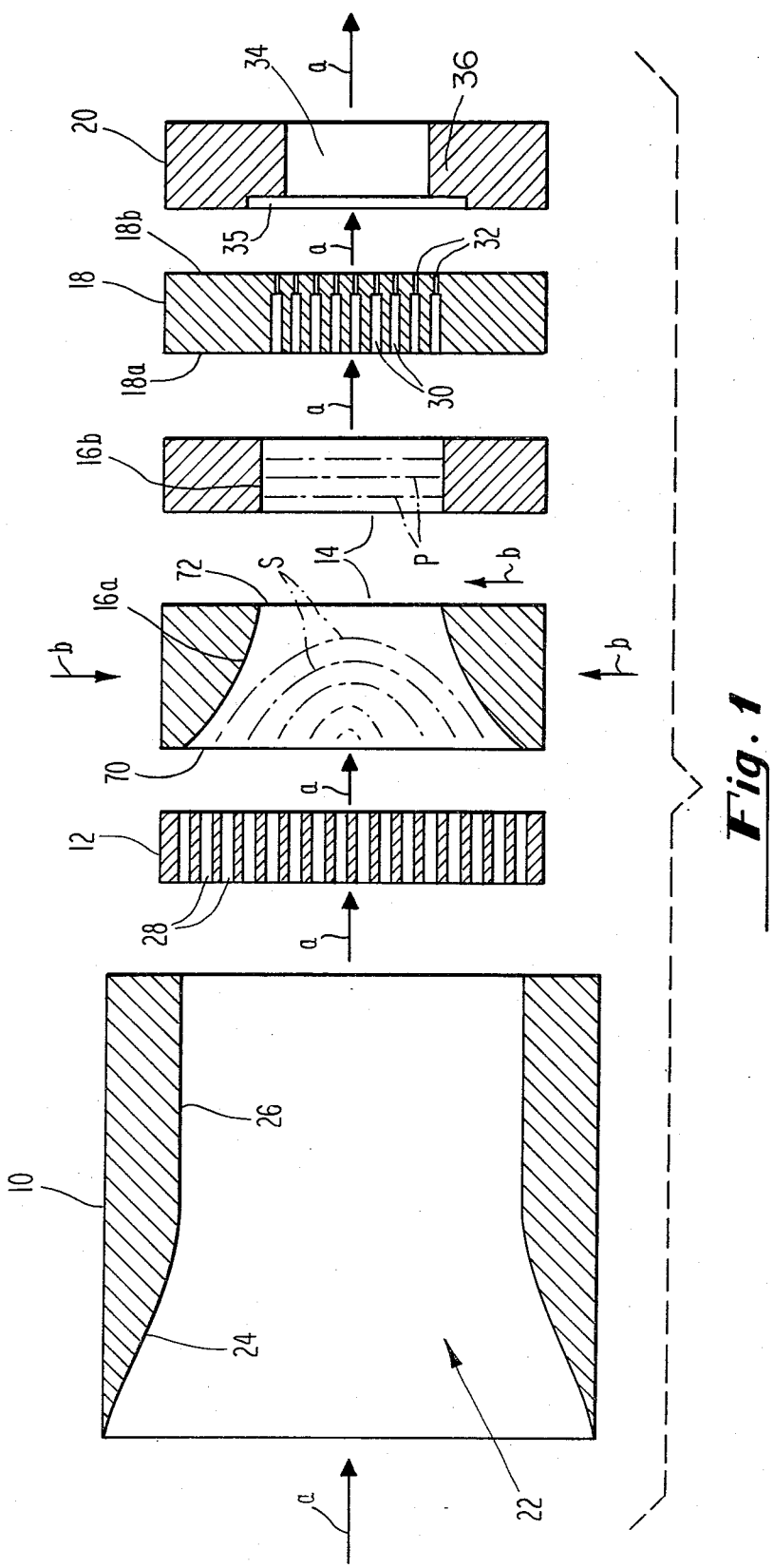
FIG. 1 is an exploded view of an extrusion assembly for making a honeycomb structure.

Referring to FIG. 1, an extrusion apparatus for making honeycomb structures having thin-walled, axially extending cells comprises a plurality of extrusion elements including an inlet sleeve 10 leading to an homogenizing plate 12. The homogenizing plate 12 is followed by a new and improved entrance cavity 14 immediately upstream from the inlet face 18a of an extrusion die 18 comprising a first, funnel section 16a and an immediately adjacent second, straight-walled section 16b. The periphery of an outlet face 18b of the extrusion die 18 is covered by a mask 20.

The inlet sleeve 10 includes an axially extending passageway 22 having a substantially larger cross-sectional area than the cavity 14 and formed to include a tapered section 24 and a cylindrical section 26. The extrusion material, which advances through the passageway 22 as indicated by arrow a, is next advanced to the homogenizing plate 12 which includes a plurality of openings 28 through which spaghetti-like strands of extrusion material flow before being merged at the output side of the plate 12.

In accordance with this invention, the extrusion material flows through the new and improved extrusion die entrance cavity 14 in the following manner. The funnel section 16a of the cavity 14 forces the extrusion batch radially inwardly in a direction indicated by the arrows b while the material is simultaneously advanced in the direction indicated by the arrows a from the larger cross-sectional area to the smaller cross-sectional area of the section 16a. As the extrusion material enters the funnel section 16a of the entrance cavity 14 at the larger cross-sectional area, the extrusion material is characterized by substantially plug flow. However, upon encountering the funnel section 16a, a substantial shearing flow as depicted by shearing profile velocity lines s is created as the extrusion material moves to the smaller cross-sectional area of the section 16a. In accordance with this invention, the shearing flow or radial velocity gradient characteristic of the funnel section 16a is terminated as the extrusion material flows through the straight section 16b having substantially uniform cross-sectional area substantially equal to or conforming with the cross-sectional area or shape of the structure to be extruded and the effective cross-sectional, flow-through area of the die. The extrusion material is characterized by plug flow as depicted by plug flow velocity profile lines s.

At the extrusion die 18, the extrusion material passes through passageways including a plurality of feed holes 30 which communicate with interconnected discharge slots 32 for forming a honeycomb structure having a plurality of axially extending, thin-walled cells or channels. The peripheral cells of the structure upon leaving the extrusion die 18 may be collapsed by means of the mask 20 which includes an opening 34 having an appropriate cross-sectional area so as to substantially equal or conform with the cross-sectional area or shape of structure to be extruded and a peripheral portion 36 blocking a limited number of passageways (i.e., feed holes 30 and slots 32) and spaced from the outlet face 18b by a gap 35 so as to collapse the required number of peripheral cells of the extruded structure to provide a skin on the extruded structure of the desired thickness.

In accordance with this invention, the skin on the periphery of the structure is of high quality, i.e., substantially uniform and unbroken. At the same time, the cells adjacent the skin of the structure are not collapsed, but only those cells which are necessary to form the skin itself are collapsed. This high degree of skin quality and minimal crushing of peripheral cells is accomplished by virtue of the entrance cavity 14 which is constructed in accordance with this invention so as to include the funnel section 16a as well as the straight-walled section 16b which assures that the shearing flow which necessarily results from the reduction of the cross-sectional area in the funnel section 16a reverts to plug flow in a straight-walled section 16b.

Figure 2:
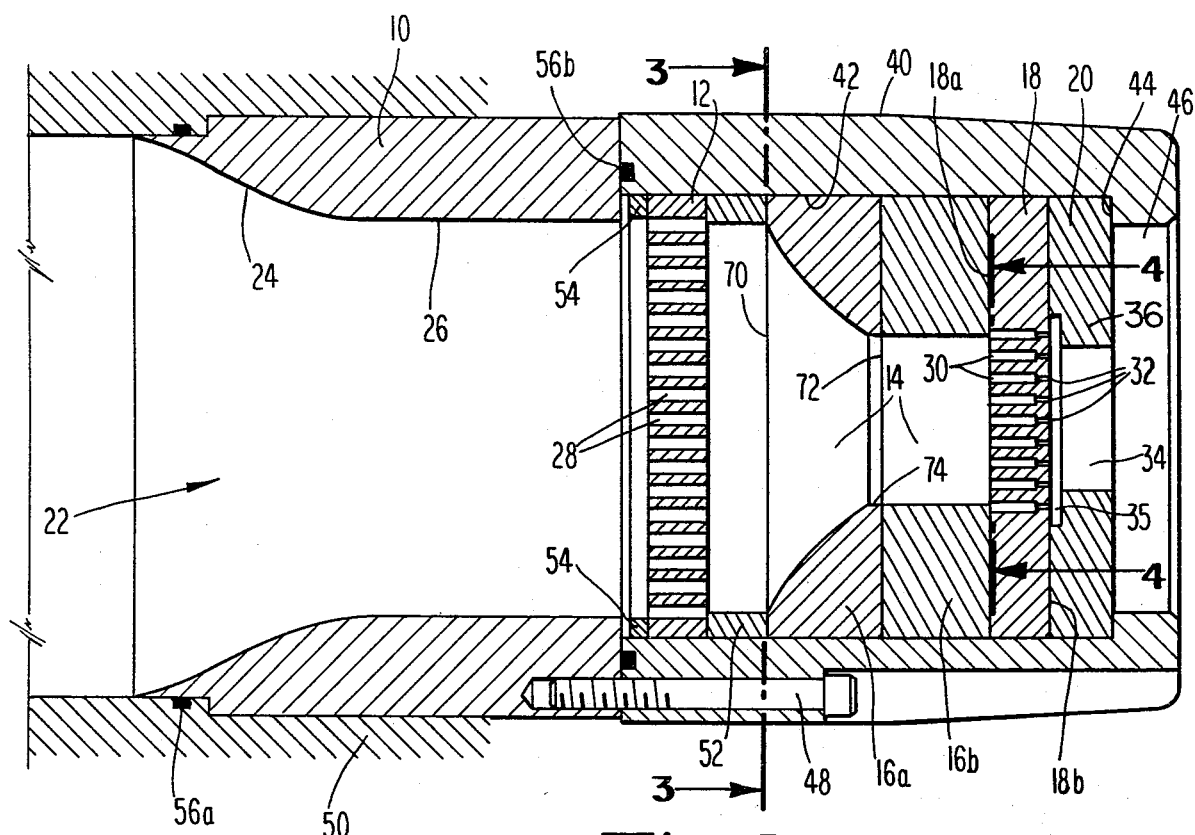
FIG. 2 is a sectional view of the assembly shown in FIG. 1.
Figure 3:
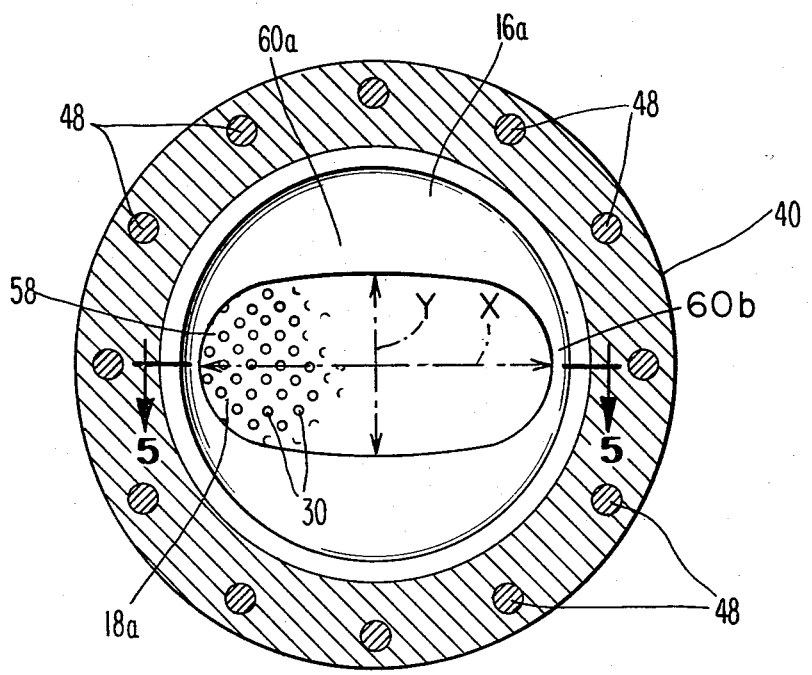
FIG. 3 is a sectional view of the assembly shown in FIG. 2 taken along line 3—3.
Figure 4:
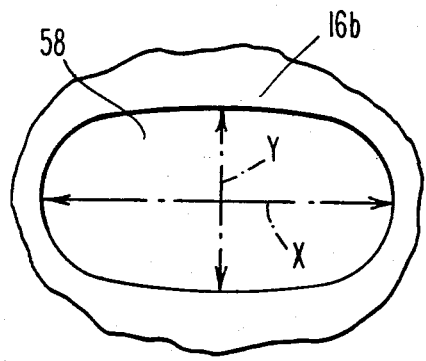
FIG. 4 is a sectional view of the assembly shown in FIG. 2 taken along line 4—4.

Referring now to FIGS. 2 through 4, the elements of FIG. 1 are combined in an extrusion barrel assembly 30 where the cross-sectional area of the extruded structure is substantially smaller than the largest cross-sectional area in the extrusion barrel. A housing 40 includes a bore 42 which receives the homogenizing plate 12, the funnel section 16a, the straight-walled section 16b, the extrusion die 18 and the mask 20. The mask 20 abuts a shoulder 44 adjacent an outlet 46 of the extrusion assembly. The housing 40 is secured to the inlet sleeve 10 by a plurality of bolts 48 which are circumferentially spaced about the periphery of the assembly as best shown in FIG. 3. The inlet sleeve 10 is, in turn, supported within a fixture 50 as shown in FIG. 2.

As also shown in FIG. 2, the extrusion assembly includes a number of additional components. A spacing ring 52 is located between the homogenizing plate 12 and the funnel section 16a so as to form an inexpensive wear surface for fusing the spaghetti-like extrusion material leaving the homogenizing plate 12 before entering the entrance cavity 14 leading to the extrusion die 18. A ring 54 is positioned immediately upstream of the homogenizing plate 12. A sealing ring 56a is located between the fixture 50 and the inlet sleeve 10 adjacent the tapered section 24. Another sealing ring 56b is located between the housing 40 and the inlet sleeve 10.

Referring now to FIGS. 3 and 4, it will be seen that the portion of the entrance cavity 14 leading to the exposed flow-through portion of the inlet face 18a on the die 18 is noncircular. More specifically, the straight-walled section 16b of the entrance cavity has a noncircular or nonround opening 58 in the form of a racetrack-like shape or cross-section so as to form axially asymmetric honeycomb structures having noncircular or nonround transverse cross-sections. It is such a noncircular structure which particularly benefits from the use of an entrance cavity having a funnel section 16a followed by a straight-walled section 16b.

Figure 5:
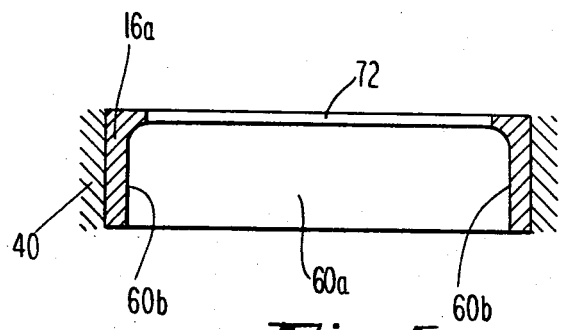
FIG. 5 is a sectional view taken along line 5—5 of FIG. 3.

It will be appreciated that the funnel section 16a includes tapering or curved surface portions 60a which funnel the extrusion material toward the portion of the opening 58 in the straight-walled section 16b generally in the vicinity of the minor axis Y. However, due to the noncircular nature of the opening 58 in the straight-walled secton 16b, there is no necessity for a tapered or curved surface at surface portions 60b in section 16a leading to the portion of the opening 58 generally in the vicinity of the major axis X. Nevertheless, by reference to FIG. 5, it will be seen that the surface portions 60b in the funnel section 16a, which are continuous with surface portions 60a, are substantially straight except for small curved downstream portions thereof. Thus, the portion of the extrusion material moving along the surface 60b will not undergo any substantial shearing flow as it approaches the extremities of the major axis X of the racetrack opening 58. However, the portion of the extrusion material moving along the surface 60a will undergo substantial shearing flow as it approaches the minor axis Y of the racetrack opening so as to benefit from the use of the straight-walled section 16b to permit a reversion to plug flow.

Figure 6:
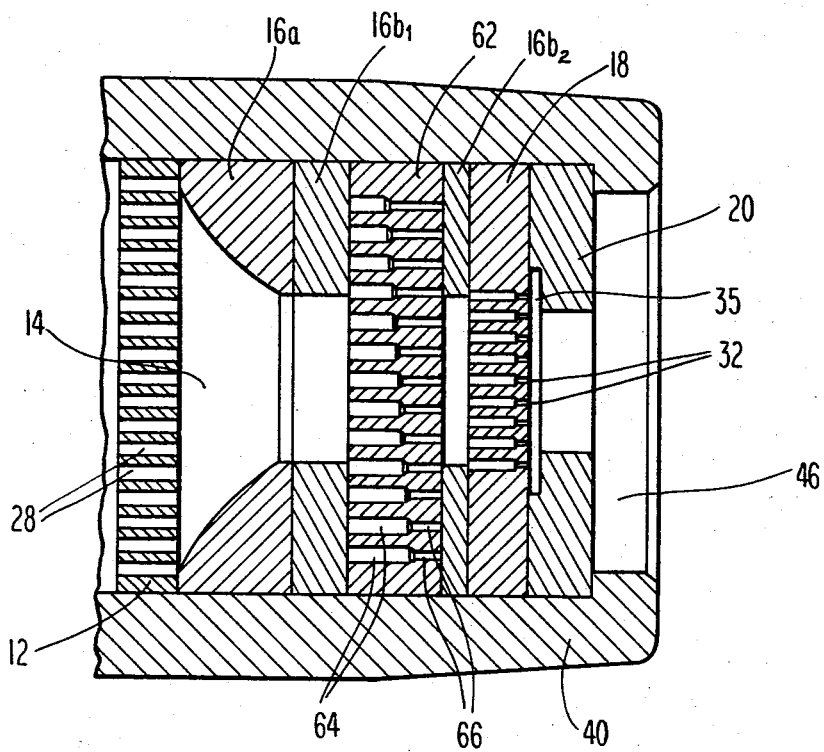
FIG. 6 is a sectional view of an alternative embodiment of the invention.

Another embodiment of this invention is shown in FIG. 6 wherein the entrance cavity incorporates a bow deflector 62 which is immediately preceded by the first portion $16b_1$ of the straight-walled section of the entrance cavity and a second portion $16b_2$ of the straight-walled section of the entrance cavity 14. It will, therefore, be appreciated that the shearing flow generated in the funnel section 16a is allowed to revert to plug flow in the portion $16b_1$ of the straight-walled section prior to reaching the bow deflector 62. The second portion $16b_2$ of the straight-walled section separates the bow deflector 62 from the die 18 a sufficient distance so as to permit the bow deflector 62 to appropriately function. The bow deflector 62 as shown in FIG. 6 includes a plurality of feed holes 64 of varying lengths which communicate with a plurality of outlet passageways 66 of varying lengths. The purpose and operation of such a bow deflector 62 is to correct bowing in accordance with extrusion principles shown in U.S. Pat. No. 4,168,944—Morikawa et al. which is incorporated herein by reference.

Referring again to FIGS. 1 and 2, it will be appreciated that the rate of tape of the funnel section 16a varies as a function of distance from the straight-walled section 16b and the die 18. The rate of taper is greater at the face 70 of the funnel section 16a remote from the straight-walled section 16b and the die 18 and the rate of taper is less and reaches a minimum at the face 72 adjacent the section 16b. Preferably, there is no taper at all for a short section 74 immediately adjacent the face 72 as shown in FIG. 2.

In the preferred embodiment of the invention, the surface of the cavity 14 in the funnel section 16a as well as the straight-walled section 16b is characterized by a fairly high degree of polish. The surfaces of the cavity 14 are polished so as to have a roughness less than 200 microinches and less than 100 microinches preferred. At the same time, it will be appreciated that the use of the straight-walled section 16b renders the extrusion somewhat insensitive to the roughness of the entrance cavity including the funnel section 16a since plug flow is assured by the straight-walled section 16b even when the straight-walled section 16b and the funnel section 16a are irregularly worn so as to provide a nonuniformity in roughness.

The overall axial length of the straight-walled section 16b should be sufficient to assure that the shearing flow established by the funnel section 16a is allowed to revert to plug flow. However, the overall length is not critical as long as it exceeds the minimum necessary to revert to plug flow.

In this connection, it has been found that the length required for reversion to plug flow from shearing flow is a function of the particular extrusion material and its Bingham plastic property which is characterized by a fluid dynamic yield threshold or yield point. This axial length is also a function of other parameters including cross-sectional area reductions in the funnel section, velocity and surface roughness. As long as the straight channel wall shearing stress to flow is below the yield point and the straight section axial length is sufficient to allow dissipation of the shearing energy generated by the funnel section, no shearing flow will occur. However, when the open channel flow stress exceeds the yield point, flowing shear will begin. Since the straight-walled section provides open channel flow stress which is well below the yield point of the extrusion material, the shearing flow will revert to plug flow in the straight-walled section 16b prior to reaching the die 18 as long as the section 16b is of sufficient axial length.

In order to achieve this reversion to plug flow for a variety of Bingham plastics, it is desirable to have a straight-walled section 16b having an overall axial length which is determined experimentally for a given Bingham plastic. However, it has been found that, for a variety of Bingham plastics, an axial length of at least 0.5 inch is sufficient with a length of 2.0 inches providing even greater latitude to accommodate the above-mentioned parameters. In connection with the parameter of cross-sectional area reduction, it has been found that an axial length equal to at least 12% of the maximum reduction of the cross-sectional dimension through the funnel section, e.g., difference between the diameter of the entrance cavity 14 at the inlet face 70 and the minor axis of the entrance cavity 14 at the outlet face 72. Preferably, the axial length is equal to at least 25% and more preferably 50% of the reduction in this dimension.

It will be understood that the opening 58 through the straight-walled section 16b of the entrance cavity 14 substantially equals or conforms in cross-sectional area with and is substantially the same shape as the exposed, flowthrough area of the inlet face 18a of the die 18. As a result, the cross-sectional area and shape of the opening 58 substantially corresponds with the cross-sectional area and shape of the structure which leaves the extrusion die. However, it is generally desirable to utilize the entrance cavity 14 which is slightly larger than the nominal size of the extruded structure by some additional factor. Where ceramic extrusion materials are utilized, it is generally desirable to provide for some shrinkage as well as the additional factor. Where, for example, the nominal size of a racetrack structure is 6.68 inches by 3.18 inches, it is desirable to provide somewhat larger dimensions in the entrance cavity in accordance with the following equations:

Major axis (6.68/0.941)+0.500=7.599 inches

Minor axis (3.18/0.941)+0.500=3.879 inches where 0.500 is an additional factor and the division 0.941 takes into account shrinkage. The additional 0.500 inch factor accommodates the use of a backing plate between the entrance cavity and the die where the backing plate has an opening with slightly smaller dimensions than the entrance cavity in the straight-walled section, i.e., major and minor axis measurements no more than 0.500 inch smaller than the straight-walled section of the entrance cavity. It will, however, be appreciated that the cross-sectional area of the opening in the backing plate and the cross-sectional area of the straight-walled section of the entrance cavity are sufficiently close so as to produce substantial or near total plug flow at the extrusion die because of the insubstantial reduction in cross-sectional area effected by the backing plate.

From the foregoing, it will be appreciated that various extrusion materials may be utilized which are characterized as Bingham plastics including sinterable powders which are metallics, ceramics, cermets, glasses-ceramics and other ceramic based materials.

Details concerning the nature of the mask 20 and its function with the extrusion die 18 are disclosed in U.S. Pat. No. 4,008,003—Folmar et al. and incorporated herein by reference. It will be appreciated that the use of the entrance cavity 14 substantially minimizes criticalities in the mask 20 and its dimensions and location by assuring the formation of a high quality skin.

It will be also appreciated that the invention has been described in specific terms of a method and apparatus for making a "racetrack" type honeycomb structure. However, various shapes of honeycomb structures may be made utilizing the method and apparatus but it will be appreciated that the greatest benefits may be derived from honeycomb structures having noncircular cross-section.

Although particular embodiments have been shown and described and alternatives suggested, other embodiments and alternatives will occur to those of ordinary skill in the art and such embodiments and modifications will fall within the spirit and scope of the invention as set forth in the appended claims.

I claim:

1. Apparatus for extruding a honeycomb structure having thin-walled cells from an extrudable material comprising:
    an extrusion die having an inlet face, an outlet face and passageways extending between said faces for forming said honeycomb structure from said material, said passageways including a plurality of feed holes communicating with interconnected discharge slots sequentially in the direction of extrusion;
    an entrance cavity coupled to said inlet face, said entrance cavity including a funnel section tapering inwardly from a larger cross-sectional cavity area to a smaller cross-sectional cavity area and a substantially straight-walled section extending between said funnel section and said inlet face and with a cross-sectional cavity area substantially conforming to said smaller cross-sectional cavity area and to the cross-sectional area of the structure to be extruded through said die.

2. The apparatus of claim 1 wherein said funnel section and said straight-walled section are immediately adjacent.

3. The apparatus of claim 2 wherein said straight-walled section includes a bow deflector.

4. The apparatus of claim 1 further comprising a homogenizing plate including a plurality of openings located in advance of said entrance cavity.

5. The apparatus of claim 1 wherein said funnel section includes a polished surface for contacting the extrusion material having a roughness less than 200 microinches.

6. The apparatus of claim 1 wherein said straight-walled section includes a polished surface for contacting the extrusion material having a roughness less than 200 microinches.

7. The apparatus of claim 1 wherein said reduced cross-sectional area of said funnel section and said cross-sectional area of said straight-walled section is non-circular.

8. The apparatus of claim 1 wherein the taper of said funnel section is contoured such that the rate of taper changes as a function of distance from the straight-walled section.

9. The apparatus of claim 8 wherein the rate of taper is greater at the axial extremity of said funnel section remote from said straight-walled section and less at the axial extremity of said funnel section adjacent said straight-walled section.

10. The apparatus of claim 9 wherein the rate of taper is at a minimum at the axial extremity of said funnel section adjacent said straight-walled section.

11. The apparatus of claim 1 wherein the overall axial length of said straight-walled section is at least 0.5 inch.

12. The apparatus of claim 1 wherein the overall axial length of said straight-walled section is at least 12% of the maximum reduction in a cross-sectional dimension of said entrance cavity between said larger cross-sectional area and said smaller cross-sectional area.

13. The apparatus of claim 1 wherein the overall length of said straight-walled section is sufficient to change the shearing flow of the extrudable material present in the funnel section to plug flow before reaching said die.

14. Apparatus for extruding a honeycomb structure including a plurality of thin-walled cells from an extrudable Bingham plastic material comprising:
first means for creating shearing flow in said material while reducing the cross-sectional area of said material from an initial cross-sectional area to a lesser cross-sectional area;
second means for receiving said material from said first means for establishing substantial plug flow in said material while the lesser cross-sectional area of the material is substantially maintained; and
extrusion die means including a plurality of passageways for forming said structure, said passageways including a plurality of feed holes communicating with interconnected discharge slots sequentially in the direction of extrusion, said die means being located adjacent said second means for receiving said material from said second means while in the state of substantial plug flow, said die means having an exposed flow-through cross-sectional area substantially corresponding to said lesser cross-sectional area.

15. The apparatus of claim 14 further comprising mask means for collapsing a plurality of cells at the periphery of said structure and forming a substantially continuous skin at said periphery.

16. The apparatus of claim 14 further comprising homogenizing means including a plurality of openings located in advance of said first means.

17. The apparatus of claim 14 wherein said second means includes bow deflector means.

18. The apparatus of claim 14 wherein said lesser cross-sectional area created by said first means and maintained by said second means is noncircular.

19. The apparatus of claim 14 wherein the rate of change in cross-sectional area in said first means is a function of the distance from said second means.

20. The apparatus of claim 14 wherein the rate of change in cross-sectional area is greater at the extremity of said first means remote from said second means and less at the extremity of said first means adjacent said second means.

21. The apparatus of claim 14 wherein the rate of change of coss-sectional area is at a minimum at the extremity of said first means adjacent said second means.

22. The apparatus of claim 14 wherein the overall axial length in the direction of plug flow of said first means is at least 0.5 inch.

23. The apparatus of claim 14 wherein the overall axial length in the direction of plug flow of said first means is at least 12% of the maximum reduction in cross-sectional dimension of said first means between said initial cross-sectional area and said lesser cross-sectional area.

24. A method of extruding a honeycomb structure having a plurality of thin-walled cells from an extrudable Bingham plastic material using an extrusion die having passageways including a plurality of feed holes communicating with interconnected discharge slots sequentially in the direction of extrusion, said method comprising:
advancing the material toward said die;
reducing the cross-sectional area of the material transverse to the direction of advancement;
creating shearing flow in the material as the material is advanced toward the die and the cross-sectional area is reduced;
maintaining constant the reduced cross-sectional area of the material;
establishing plug flow in the material and substantially terminating shearing flow in the material while maintaining constant the reduced cross-sectional area prior to reaching the die; and
extruding the material through the die so as to form the structure with a cross-sectional area substantially conforming to the reduced cross-sectional area of the material prior to reaching the die.

25. The method of claim 24 including the step of collapsing a plurality of cells at the periphery of said structure and forming a substantially continuous skin at said periphery.

26. The method of claim 24 wherein the reduced cross-sectional area is noncircular.

27. The method of claim 24 wherein the rate of reducing the cross-sectional area of the material transverse to the direction of advancement changes as a function of distance from said die.

28. The method of claim 27 wherein the rate of reduction of cross-sectional area is greater at a position more remote from said die and less at a position nearer said die.

29. The apparatus of claim 1 including a mask coupled to said outlet face and having a peripheral portion covering a plurality of said passageways and a central opening substantially conforming to the cross-sectional area of the structure to be extruded.

* * * * *

UNITED STATES PATENT AND TRADEMARK OFFICE
CERTIFICATE OF CORRECTION

PATENT NO. : 4,364,888
DATED : December 21, 1982
INVENTOR(S) : Philip S. Levin

It is certified that error appears in the above-identified patent and that said Letters Patent are hereby corrected as shown below:

Column 8, line 19, change "4,008,003" to -- 4,008,033 --.

Column 8, line 32, change "section" to -- sections --.

Signed and Sealed this

First Day of November 1983

[SEAL]

Attest:

GERALD J. MOSSINGHOFF

Attesting Officer   Commissioner of Patents and Trademarks

UNITED STATES PATENT AND TRADEMARK OFFICE
CERTIFICATE OF CORRECTION

PATENT NO. : 4,364,888

DATED : December 21, 1982

INVENTOR(S) : Philip S. Levin

It is certified that error appears in the above-identified patent and that said Letters Patent is hereby corrected as shown below:

Column 4, line 66, change

"s" to -- P --.

Signed and Sealed this

Fourteenth Day of January 1986

[SEAL]

Attest:

DONALD J. QUIGG

Attesting Officer

Commissioner of Patents and Trademarks